This invention relates to a method of making a reconstituted sheet out of a multiplicity of flakes originally in the form of an agglomerate, and more particularly the invention relates to the method of making a reconstituted sheet out of a multiplicity of mica flakes. Most particularly, the present invention relates to the method of making a reconstituted sheet from a multiplicity of flakes of synthetic mica which are originally in the form of an agglomerate or chunk.

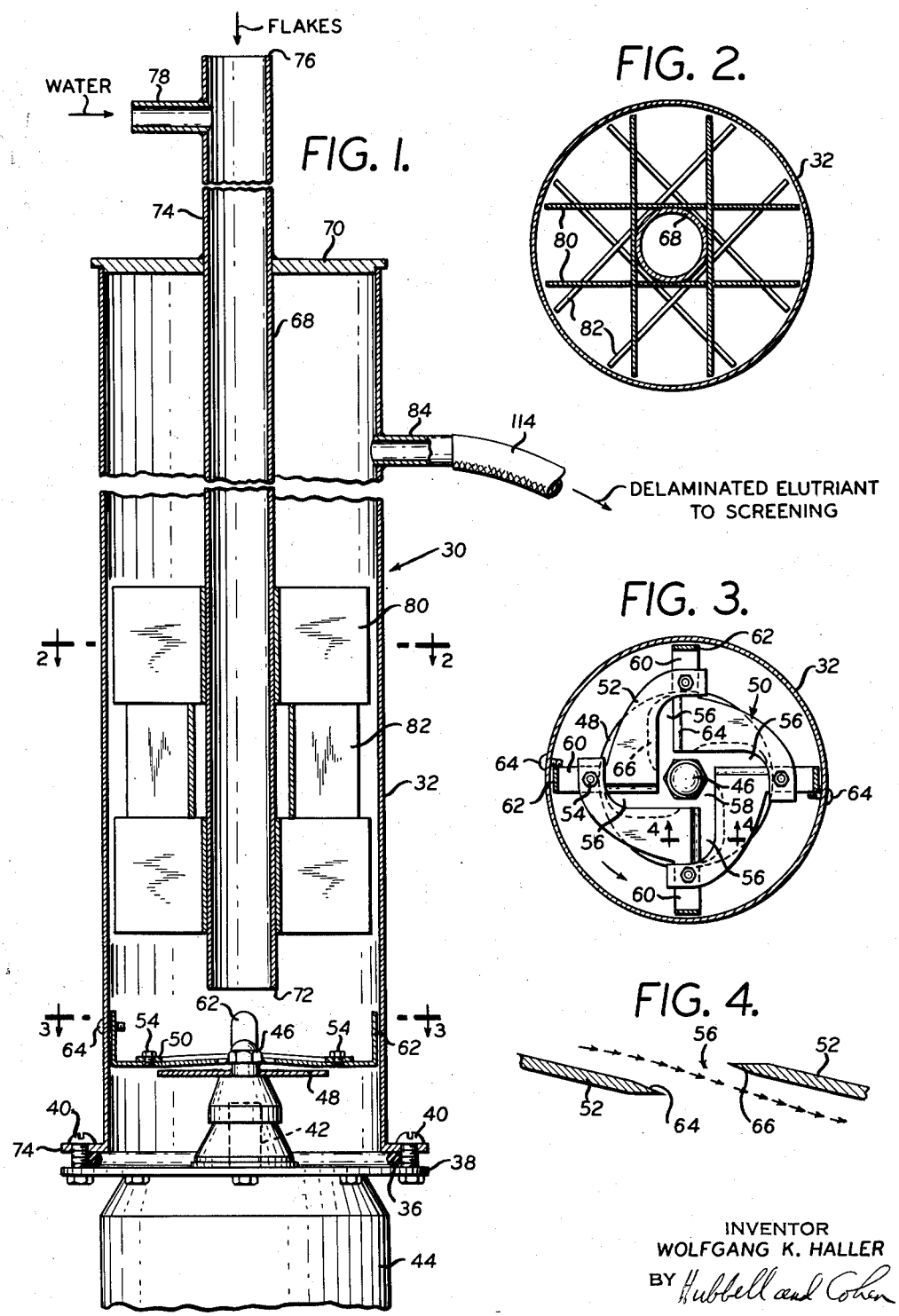

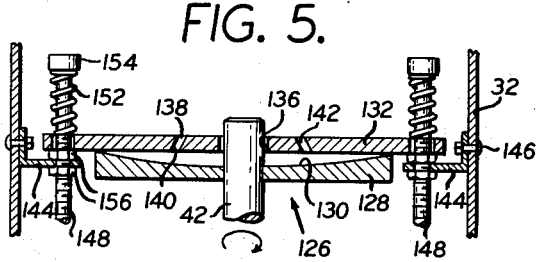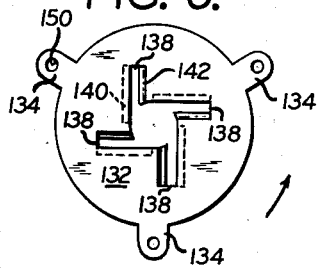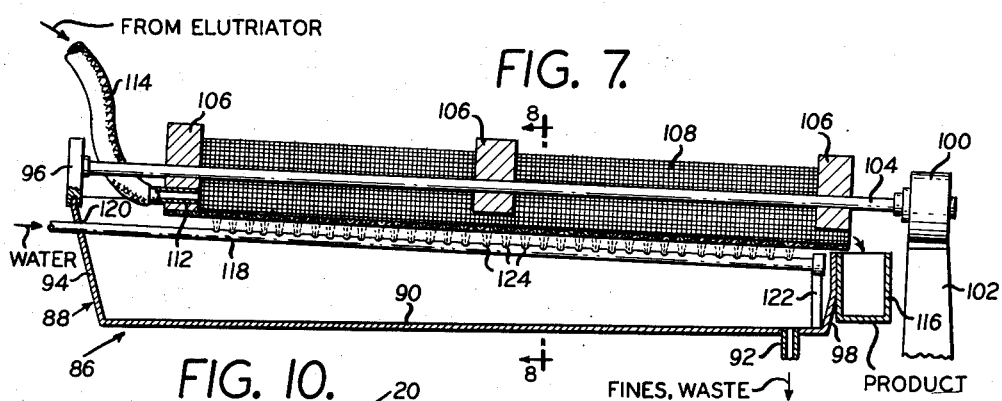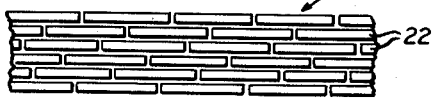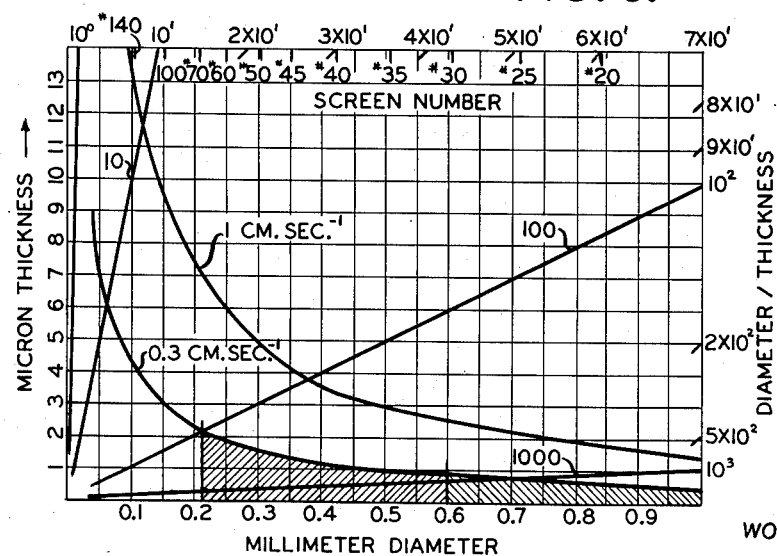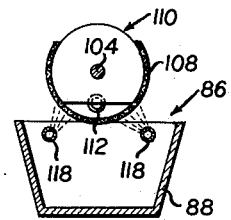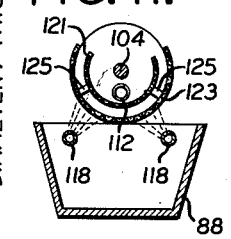
INVENTOR
WOLFGANG K. HALLER 3,087,482
METHOD AND APPARATUS FOR MAKING RECONSTITUTED SYNTHETIC MICA SHEET
Wolfgang K. Haller, Washington, D.C., assignor to Mycalex Corporation of America, Clifton, N.J., a corporation of New York
Filed Feb. 25, 1958, Ser. No. 717,485
27 Claims. (Cl. 125—24)

In U.S. Patent No. 2,711,435, granted to Richard A. Humphrey on June 21, 1955, for Electric Furnace and Electric Melting and Crystallizing Method for Minerals, a practical method of making synthetic mica is described and claimed. Briefly, the method comprises the steps of passing electrical current through powdered batch material which is stoichiometrically equivalent to the final mica product, the electric current causing the powdered batch material to melt and react. After the reaction has taken place, the electric current is turned off and the molten mass is permitted to cool and crystallize into a large chunk or pig of synthetic mica such as, for instance, synthetic fluor-phlogopite mica having the formula $K_2MgAlSi_4O_{10}F_2$. While some of the crystals found in this mass are of sufficient area to be used in a manner similar to natural mica, such as natural muscovite mica, a substantial percentage of the resulting crystals are too small for subsequent fabrication as by punching to be used for tube spacers and other similar articles commonly made of mica.

To date, therefore, the major commercial use for synthetic mica has been in the field of ceramoplastics wherein the synthetic mica crystals are finely divided and the finely divided mica particles are bonded together by high quality electrical glass.

There have been in the past attempts to take mica flakes too small for use as tube spacers and the like and to reconstitute these flakes, as by a process analogous to paper making, into a continuous sheet which may be used as a mica substitute. Generally speaking, a reconstituted sheet after being made by a paper making process, relies for its strength solely on the natural cohesive forces of the mica flake. Of course, if desired, the sheet may be strengthened by impregnating it with a suitable binder and then curing the binder. However, in this specification, except when otherwise noted, the term "reconstituted sheet" will mean an unbonded sheet made up of substantially 100% flake material such as mica. These attempts have been made both with synthetic mica and natural mica. However, to date, and particularly with synthetic mica, the reconstituted sheet made has been a poor substitute for natural mica crystal particularly with regard to mechanical strength and dielectric properties. For instance, the best reconstituted synthetic mica sheet presently available on the market has a tensile strength of only about 600 p.s.i. and a dielectric strength of only about 300 volts per mil. When this is compared with the tensile and dielectric strength of synthetic mica crystal, it will be seen that the reconstituted synthetic mica sheet now available has extremely limited use as a mica substitute.

One object of the present invention is the provision of a new and improved method for selecting flakes to be used in making a reconstituted sheet therefrom.

Another object of the present invention is the provision of a new and improved method for selecting flakes of synthetic mica for making a reconstituted sheet therefrom.

Another object of the present invention is the provision of a new and improved method and apparatus for delaminating flakes from a chunk of readily delaminable material.

Yet a further object of the present invention is the provision of a new and improved method and apparatus for delaminating synthetic mica flakes from a chunk thereof.

Still another object of the present invention is the provision of a new and improved apparatus for delaminating mica flakes from a chunk thereof and for selecting flakes having certain geometric proportions, said apparatus being effective for recirculating those flakes not previously selected back to the delaminating apparatus.

Another object of the present invention is the provision of a new and improved apparatus for selecting flakes having an area above a predetermined size and for separating said flakes from those having a size smaller than said predetermined area.

The above and other objects, characteristics and features of construction will be more fully understood from the following description taken in connection with the accompanying illustrative drawings.

In the drawings:
FIG. 1 is a vertical sectional view of apparatus for delaminating mica flake from a chunk thereof and for elutriating the delaminated flake;
FIG. 2 is a sectional view taken along the line 2—2 in FIG. 1;
FIG. 3 is a sectional view taken along the line 3—3 in FIG. 1 and showing one form of delaminator embodying the present invention;
FIG. 4 is a sectional view taken along the line 4—4 in FIG. 3;
FIG. 5 is a vertical sectional view of a modified form of delaminator embodying the present invention;
FIG. 6 is a plan view of the stator of the delaminator shown in FIG. 5;
FIG. 7 is a longitudinal vertical sectional view of apparatus for screening mica flake;
FIG. 8 is a sectional view taken along the line 8—8 in FIG. 9;
FIG. 9 is a graph illustrating the method of selection of flake for making reconstituted sheet;
FIG. 10 is a sectional view of a reconstituted sheet made in accordance with the present invention; and
FIG. 11 is a sectional view similar to FIG. 8 showing a modified form of apparatus for screening mica.

*Theoretical Considerations*

FIG. 10 diagrammatically illustrates a reconstituted sheet 20 of synthetic mica flake. As will be seen, sheet 20 comprises a multiplicity of parallel oriented synthetic mica flakes 22 which are built up one on top of another much in the form of a brick wall. It is known, and this knowledge has been employed heretofore in the making of reconstituted sheet, that the mica flakes when disposed as shown in FIG. 10 have natural surface coherence and this coherence is sufficiently great to hold the multiplicity of flakes together in the form of the sheet 20. The tensile strength of sheet 20 is dependent upon the ability of the cohering forces to resist shear when the sheet 20 is subjected to tension. Failure of the sheet in tension will be due to a sliding of adjacent flakes relative to one another and not due to a breaking of the mica itself. The resistance to shear, that is the rupture strength, is therefore proportional to the total area of the shearing surfaces in any vertical section and the frictional coefficient between adjacent flakes which is constant. The total area of the shearing surfaces will be directly dependent upon the mean diameter of the flakes and inversely dependent upon the thickness of the flakes. With simplifying assumptions, it can be demonstrated that the resistance to shear is proportional to the ratio of mean diameter to thickness of the flakes 22 making up the sheet 20. Therefore, it will be seen that the most desirable sheet 20 will be made up of relatively thin flakes having relatively large surface areas or mean diameters.

In accordance with my observations, the dielectric strength of a reconstituted sheet of a multiplicity of flakes, such as mica flakes 22, is not solely dependent upon dielectric strength of the flakes themselves. As sheet 20 is a porous body, the dielectric strength thereof is a function of potential path length for an ionizing discharge proceeding a perforating arc up to the point that the path length is so great that the dielectric strength of the flakes will break down before an ionizing discharge will be established. In this connection and for the purpose of simplification, the absence of surface conduction along the mica flakes is assumed. By suitable mathematical analysis based upon the principles set forth above, it can be shown that the dielectric strength of a reconstituted sheet 20 is also a function of the ratio of the mean diameter of the flakes 22 to the thickness thereof. Accordingly, the same geometry of flake is desirable both from a mechanical and electrical viewpoint.

The only other consideration of major importance in the manufacture of reconstituted sheet is to maintain the porosity of the sheet at a minimum. It will be obvious that porosity is minimized when the thickness of the flakes used in making the reconstituted sheet is relatively uniform. Moreover, uniformity of flake thickness insures that most superposed flakes will be in surface-to-surface relationship to thereby increase the coherence between the flakes and thus improve the mechanical strength of the reconstituted sheet.

The Method

From the foregoing theoretical considerations, it appears that having a complete distribution of flakes it is desirable to select from said distribution those flakes having a mean diameter to thickness ratio above a preselected ratio and further to select the flakes so that they have relatively uniform thickness. To data, as far as I have been able to ascertain, the methods employed to delaminate chunks of readily delaminable materials, such as mica, into flake are not suited for producing a high proportion of flake having the geometry described above. This is particularly so when the delaminating takes place in a liquid medium as contrasted with dry delamination of the type normally referred to as "mica splitting." I have chosen to delaminate mica in a liquid medium for reasons which will become apparent hereinafter. In the prior art, delamination in a liquid medium has been accomplished by subjecting the chunk of delaminable material to a jet flow of the liquid, which jet flow causes turbulence effective to chip off flake or small chunks from the chunk being delaminated. An analysis of the geometry of chunk broken up by the prior art methods shows that the geometry of the vast majority of the pieces from the broken up chunk almost completely fail to approximate the desired geometry of the relatively large diameter to thickness ratio. Instead, most of the broken up pieces are in the form of small chunks which may more aptly be called particles or small chunks rather than in the form of flake. In view of the foregoing theoretical analysis, this particle-like geometry will yeld a very unsatisfactory reconstituted sheet which has proved to be the case.

Accordingly, I propose to delaminate a readily delaminable chunk such as mica in a liquid medium by causing the liquid to have a laminar flow and further to have a very large velocity gradient in a direction normal to said flow. More particularly, it is my desire to delaminate readily delaminable chunks, such as a chunk of mica, by subjecting it to a laminar flow having a large velocity gradient normal to the flow and by slowly advancing the mica in the direction of the flow. Preferably, the chunk of mica is oriented so that its cleavage planes are parallel to the planes of liquid flow. The velocity gradient is sufficient to set up very high shear forces along the cleavage planes of the mica chunk and it is these shear forces which cause the mica to flake off rather than to break up into small chunks or particles. In accordance with the most preferred method of delaminating mica, I have found that the highest yield of desired flake can be obtained if the velocity gradient increases in the direction of flow. In other words, there will be a velocity gradient normal to the direction of flow and there will be a gradient of velocity gradient in the direction of flow. The reason for providing a gradient of velocity gradient will become apparent from the description of the delaminating apparatus operating in accordance with the aforedescribed method.

While the method of delaminating described above yields a relatively high percentage of flakes having the described preferred geometry for making a reconstituted sheet, the end product from the delamination step will still contain a substantial fraction of flake not suited for paper making. It therefore becomes necessary to select the desired flake out of the total product of the delaminator and to reject the flake having the undesired geometry. I have discovered that this selection can be accomplished by elutriating the entire product from the delaminator and then screening that fraction of the product selected by the step of elutriation. Both elutriation and screening have been employed in the past to classify small objects. However, to the best of my knowledge, the use of the two steps in combination for selecting flakes having a relatively large diameter to thickness ratio and a relatively constant thickness has never before been suggested. Neither step by itself will classify flakes so as to yield only that portion desired.

For instance, if elutriation alone is used, it can be shown that for a liquid having a relatively low viscosity, such as water, for a given upward velocity of the water, flakes having a product of thickness and diameter below a given amount dependent upon the velocity will all move upward with the liquid and be able to be separated from the remaining flakes which will tend to drop to the bottom of a column due to the effects of gravity. Therefore, the flakes which are separated from the general distribution may have either a relatively large mean diameter and relatively small thickness or they may have a relatively small mean diameter and relatively large thickness. Hence, elutriation alone will not separate only flakes which meet the requirements set forth above from flakes not meeting those requirements.

This fact is demonstrated by the graph in FIG. 9, wherein the geometry of flakes may be plotted as to thickness and mean diameter. Assuming the entire area of the chart represents the entire distribution of flake geometry to be classified, the area under any of the hyperbolic curves represents the distribution of flakes which will pass upwardly with a moving column of water and thus be separated from those flakes having geometries represented by the area above either of the hyperbolic curves, which latter flakes will settle to the bottom of the column due to the urging of gravity. A mere perusal of FIG. 9 will show that flake geometries under, for instance, the .3 centimeter per second velocity curve will range from extremely thick small area flakes to extremely thin large area flakes.

The other step of classification employed as part of my novel combination is, as was mentioned before, screening. However, screening alone will not select flakes of the proper geometry. All that screening is able to do is to separate flakes having a mean diameter above a given amount from flakes having a mean diameter below a given amount with no relation to thickness.

However, if the steps of elutriation and screening are combined, the following will result: By elutriation, for instance at .3 centimeter per second, all of the flakes represented by the area under .3 centimeter per second hyperbola in FIG. 9 will move upwardly with the upwardly moving column of water and will be separated from the remaining flakes by passing the selected flakes out of the column. If the flakes so selected by elutriation are thereafter screened, the flakes having a relatively small mean diameter, that is a mean diameter less than the size of the apertures in the screen, will pass through the screen and be separated from those flakes having a mean diameter larger than the spacing of the screen. Again referring to FIG. 9, this second step is equivalent to removing the left hand portion of the area under the curve and leaving the right hand portion thereof. It will be seen for the parameters illustrated in FIG. 9 that the flakes remaining on the screen will all have a diameter to thickness ratio larger than a predetermined ratio. Moreover, the range of thicknesses will be relatively low. The finally selected flakes will be represented by the total shaded area in FIG. 9. If it is desired to further classify the flakes to obtain greater uniformity, the elutriated fraction may first be passed through a relatively coarse mesh screen and then through a finer screen. By double screening, the fraction of the elutriated flakes having a relatively large mean diameter and hence a relatively small thickness will rest on the coarse screen and the remaining elutriated flakes will pass to the finer screen. On the finer screen flakes having a diameter larger than the spacing of the finer screen will become lodged on said finer screen and the remaining flakes will pass through the spacings in the finer screen to be collected as waste. Referring again to FIG. 9, it will be seen that the fraction of the flakes remaining on the coarse screen is represented on the graph by the area having cross-hatching extending upwardly from right to left and the fraction remaining on the finer screen is represented by the area having cross-hatching extending upwardly from left to right. The waste fraction which passes through both screens is represented by the non-cross-hatched area under the .3 centimeter per second curve.

To summarize the described method, a chunk of readily delaminable material such as mica is delaminated by liquid having a laminar flow and a relatively large velocity gradient normal to the flow. The delaminated chunk, that is the flakes resulting from the delamination step, are subjected to elutriation in an upwardly moving column of water or other liquid, and the flakes are moved up with the column of water which passed out away from said column to be screened. The flakes remaining on the screen will have the desired geometry. Of course, the steps of elutriation and screening can be reversed. That is, the flakes emanating from the delaminator may first be screened and then elutriated in a vertically moving column of water. However, as will be more fully understood from a description of the apparatus hereinafter, it will be seen that it is presently preferred to elutriate the flakes before screening the flakes as the step of elutriation has been integrated with the step of delamination to yield an extremely convenient simple apparatus for accomplishing these two steps.

It will be understood that the selection of the velocity of the upwardly moving column of water and the selection of the screen size are practical considerations. It will be obvious that the higher the velocity of the upwardly moving column of water, the larger the number of flakes selected by the elutriator and thus the larger the yield for a given amount of raw flake material. However, the larger velocity will give a larger range of flake sizes. Accordingly, the chosen velocity must be a compromise between flake yield and quality of the final reconstituted sheet product. Likewise, the smaller the screen used to screen the elutriated flakes, the larger the quantity of flakes remaining on the screen for subsequent paper making. However, the smaller the screen size, the smaller will be the minimum diameter to thickness ratio of the selected fraction. Accordingly, a like compromise must be made as to the screen size, the major factors again being yield of usable mica flakes versus the quality of the final product.

*Apparatus*

The apparatus employed to delaminate and classfy mica flakes is illustrated in FIGS. 1 through 8, and FIG. 11. Referring first to FIG. 1, a combined delaminator-elutriator 30 is illustrated. The apparatus comprises a vertically extending pipe 32 which forms a housing for the combined delaminator and elutriator. Disposed adjacent the bottom of pipe 32 is a delaminator 33. The pipe may be made of any suitable material such as, for instance, metal, plastic or glass. From a commercial viewpoint, metal is presently preferred due to its ruggedness and low cost. Extending outwardly from the bottom of pipe 32 is a flange 34 which is sealed to the wall of pipe 32 as by welding. Flange 34 is mounted on a suitable sealing element such as an O-ring 36 which abuts against a plate 38 which is parallel to flange 34 and vertically spaced therefrom by the O-ring. The flange 34 and plate 38 and the O-ring are held in fixed sealing relation as by a plurality of nuts and bolts 40.

Extending upwardly through an aperture 39 in the plate 38 is the output shaft 42 of a motor 44. Mounted on the output shaft of the motor as by a nut 46 is a rotor which is in the form of a circular planar disc 48. Overlying disc 48 is a stator 50 which is also a plate-like device of particular configuration and construction as will be described below. The rotor and stator together form the delaminator 33.

Referring now to FIG. 3, the stator 50 is formed of a plurality, here shown as four in number, of right angle members 52. The members are in mutually overlapping relation and are connected to one another as by nuts and bolts 54. The mutual overlapping relation of the right angle members 52 provides stator 50 with a surface configuration which confronts rotor 48 of such form that there is a taper in the space between the rotor and stator, the thickest or widest portion of the space being adjacent the axis of rotation of the rotor and the thinnest or narrowest portion of the space being adjacent the periphery of the rotor. The right angle members 52 have their edges spaced from one another so as to define a plurality of slots 56 which extend outwardly from a central aperture 58 toward the periphery of the stator. As shown herein, slots 58 do not extend toward the periphery along radii but are off-set from the center of the stator. While this is presently preferred, the apparatus will function satisfactorily with radially extending slots. The space 58 is sufficiently large to permit it to receive nut 46 with clearance so that a minimum of rotary motion will be imparted to the stator from the nut. To prevent the stator from rotating, the right angle members 52 are each provided with an outwardly extending part 60, each having an upturned portion 62 substantially parallel to the confronting surface of the pipe 32. Extending through the wall of pipe 32 are a plurality of bolts or studs 64 which are adapted to engage the side edge of the upstanding portions 62 to prevent rotation of the stator. Moreover, and as is shown in FIG. 3, the bolts 64 overlie associated parts 60 to limit the upward movement of the stator relative to the rotor. However, with the exception of the bolts 64, the stator 50 is readily movable in the vertical direction and is biased toward the rotor 48 by gravity. Of course, if desired, a spring bias can be employed.

The operation of the delaminator made up of the rotor 48 and the stator 50 is as follows: With the pipe 32 filled with water or other liquid, when motor 44 is energized to rotate the rotor 48, the water adjacent the rotor 48 and in between the rotor and stator will tend to move with the rotor. However, the centrifugal forces will be sufficient to cause the water adjacent the rotor to move outwardly from between the rotor and stator. This movement will be substantially planar. At the same time, the water adjacent the stator 50 in the space between the rotor and stator will resist movement due to the drag of the stator. Naturally, the water in between these two outer layers of water will tend to move at varying velocities at an even vertical gradient with the maximum velocity adjacent the rotor and the minimum velocity adjacent the stator. In view of the fact that the space between the rotor and stator is tapered toward the periphery of the delaminator, the velocity gradient will be greater at the periphery where the space is smallest than it will be near the axis of rotation of the rotor where the width of the space is a maximum.

When mica chunk or other readily delaminable material is disposed near the center of the stator 50, it will be sucked into the space between the rotor and stator by the movement of the water. The mica will pass into the space through the slots 56 and these slots will operate to orient the mica which is a substantially planar chunk so that the lines of cleavage are substantially parallel to the planes of flow of the liquid in the space between the rotor and stator. The mica will be subjected to the large shearing forces resulting from the high velocity gradient, which shear forces will be effective for delaminating the flakes from the chunk. Naturally, the chunk will be delaminated first along the weakest cleavage plane as this will be the plane where the chunk will least resist the shear forces. Once cleaved, the now cleaved mica will be free to move outward with the liquid in the space between the rotor and stator towards the periphery of the delaminator. As the mica moves out toward the periphery of the delaminator, it will be subjected to ever increasing velocity gradients and hence to ever increasing shear forces which will be sufficient to further delaminate the chunk into even thinner flakes. From the foregoing description, it will be seen that the described delaminator 33 is extremely effective to produce a laminar liquid flow having a high velocity gradient normal to the flow. Hence, delaminator 33 is extremely suitable apparatus for working the method of delamination heretofore described.

Referring to FIG. 1, it will be seen that the delaminator 33 is disposed near the bottom of the vertical column defined by the pipe 32. Extending through the pipe 32 coaxially therewith is a pipe 68 of substantially smaller diameter than the pipe 32. Pipe 68 is held in the described orientation by cover plate 70 to which it is secured as by welding. Cover plate 70 is removably mounted on the top of pipe 32. The bottom 72 of pipe 68 is substantially in register with the square opening 58 in the stator 50 of the delaminator and is disposed above said opening. A portion 74 of pipe 68 extends above cover plate 70 and is open at its upper end 76. Connected to the upper end 74 of pipe 68 is an inlet 78 which is adapted to permit elutriating liquid such as water to be introduced into the pipe 68 and through pipe 68 into the vertical column defined by pipe 32. Mica chunk may be introduced into the apparatus through the upper end 76 of the pipe 68.

Secured to pipe 68 adjacent the bottom thereof are a plurality of vanes 80 which, as will be seen hereinafter, are adapted to reduce turbulence in the vertical flow of liquid flowing through the pipe 32. Although the vanes may be arranged in a number of ways to produce a relatively non-turbulent vertical flow, in the zone adjacent the outlet 84, as shown herein, the vanes 80 are arranged in three sets, each of the sets consisting of two pairs of perpendicularly oriented vanes. As may be seen from FIG. 2, the middle set 82 of vanes 80 is disposed at an angle of 45° to the disposition of the upper and lower sets of vanes, whereby a relatively large number of small vertical passages are provided. Disposed adjacent the top of pipe 32 is an outlet 84 for liquid flowing through the pipe 32.

The operation of the apparatus shown in FIGS. 1 through 4 is as follows: Pipe 32 is filled with water or other similar low viscosity liquid up to the level of the outlet 84. A continuous source of water is connected to the inlet 78 so that water will constantly flow in through the inlet 78, down through pipe 68 and upwardly past the three sets of vanes 80 to the outlet 74 and thence out of the pipe 32. With the motor 44 energized to rotate the platelike rotor 48, mica chunk is introduced into the apparatus through the upper end 76 of pipe 68. The mica chunk together with the water passing in through the inlet 78 flows downwardly to the bottom 72 of pipe 68 where the mica is in register with the opening 58 in the stator. With the rotor rotating under the urging of motor 44, water will be circulating as heretofore described in through the opening 58 and the slots 56 of the stator and between the rotor and stator and out at the periphery of the delaminator. This water flow will cause a suction-like vortex around the opening 58 in the stator which will draw the mica chunk towards the apex of the vortex where it will pass along with the water to the space in between the rotor and stator through slots 56 which preorient the mica parallel to the rotor and stator. Here the mica chunk will be subjected to large shearing forces due to the rapid movement of the water in the space toward the periphery thereof. These shearing forces will cause the mica to flake off along its cleavage plane and the flakes will pass out along with the water at the periphery of the delaminator. With the space between the rotor and stator being tapered from the center of the delaminator toward the periphery thereof, it will be obvious that only relatively thin flakes will be permitted to pass out of the delaminator, the relatively thick flakes being held in between the rotor and stator to be subjected to further delamination by the shearing forces described. Furthermore, if a relatively large mica chunk works its way between the rotor and stator, then the stator will move upwardly against the action of gravity and the suction resulting from the rapid passage of liquid between the rotor and stator so as to prevent a jamming of the delaminator.

As the flakes pass out through the periphery of the delaminator together with the rapidly moving water, they will commence moving upwardly due to the rapid local movement of the water ejected from the delaminator in the vicinity of the delaminator. This rapid local movement will naturally be damped in the vicinity of the delaminator by the surrounding water. Thereafter, the vertical movement of the column of water will be dependent only upon the input to the elutriator through the inlet 78. Accordingly, except for the local vertical movement caused by the water ejected from the delaminator which will carry along substantially all mica flake ejected from the delaminator, only those flakes having a product of means diameter and thickness less than the predetermined amount dependent on the velocity of flow will continue to move up with the vertically moving column of water. These flakes will pass the plurality of vanes 80 which reduce turbulence and will move upwardly to the top of the pipe 32 and thence out of the pipe through the outlet 34. The remaining fraction of flakes, that is those flakes having a product of mean diameter and thickness greater than the predetermined value dependent upon the rate of vertical flow of the water, will commence dropping back towards the bottom of the pipe due to gravity and these flakes will be sucked back into the delaminator for further delamination. Thus in one compact apparatus I provide means for delaminating mica chunk as well as means for elutriating the delaminated flakes. By providing these two means in the same unit, I obtain automatic recirculation to the delaminator of that fraction of the flakes which are not taken off by the vertical movement of the water.

As stated above in the description of the method employed herein, the flakes which pass off from the elutriator, that is, the flakes having a predetermined product of mean diameter and thickness, are subsequently screened so as to eliminate from the elutriated fraction of the flakes those flakes which have a large thickness but small mean diameter. FIGS. 7 and 8 illustrate one form of screening apparatus for use in the screening step. This apparatus is generally designated by the reference numeral 86. Schreener 86 comprises a trough 88 having a bottom 90 thereof oriented at a slight angle to the horizontal. At the lowest point of the bottom of the trough a waste outlet 92 is provided. Mounted on the end 94 of the trough 88 is a bearing plate 96. Disposed adjacent the other end 98 of trough 88 is an ocillating motor means 100 which is mounted on any suitable supporting bracket 102. The output shaft 104 of the motor means 100 is supported at its free end by the bearing plate 96 so that when motor means 100 operates, shaft 104 oscillates through an angle of approximately 120°. Fixed to shaft 104 are a number of brackets 106, the peripheries of which are preferably at least partially arcuate. Fixed to the brackets 106 is a screen 108, the periphery of which defines a relatively large arc, perhaps of 270° with an opening 110 at the top thereof. Shaft 104 and screen 108 are disposed at a slight angle to the horizontal. Adjacent the upper end of the screen 108 is an inlet 112 which is connected to a hose or conduit 114 extending from the outlet 84 of the pipe 32 to the inlet 112. In this manner the fraction of mica flakes which pass out of the elutriator through the outlet 84 are directly transported in a liquid medium to the screen 108 for screening.

By providing an oscillating screen, the path of movement of the mica flake introduced onto the slanting screen 108 through the inlet 112 will be approximately sinusoidal which will extend the total length of the screening path to many times the actual longitudinal extent of the screen 108. Accordingly, the screener 86 may be much shorter in longitudinal extent than would be required if an oscillating screen were not employed. As the mica flake moves down the screen from the high end thereof to the low end thereof, those flakes having a diameter smaller than the spaces in the screen will drop through the screen into the trough 88 and thence out through the waste outlet 92. However, those flakes having a diameter larger than the screen spacing will continue to move downwardly in a sinusoidal path along the screen until they reach the low end of the screen where they will drop out into a container 116 mounted on the end 98 of the trough. The flakes collected in the container 116 will have been elutriated and screened and hence will have the desired diameter to thickness ratio as described hereinbefore.

To prevent clogging of the screen by mica flake which might get lodged in the screen spaces, a pair of pipes 118 extend parallel to the screen on both sides thereof. As is shown in FIG. 8, the pipes are disposed within the projected volume of the trough 88 and enter said trough through apertures 120 in end 94 and are fixed adjacent the end 98 as to brackets 122. Each of the pipes is provided with a plurality of spaced apertures 124 which are directed at the screen. The ends of the pipes 118 extending outside of the trough 88 are connected to a suitable source of water, which water flows through the pipes 118 and out through the openings 124 with considerable velocity to impinge on the outside of the screen. The force with which the water impinges on the screen is sufficient to dislodge mica flakes caught in the screen openings so that the openings are available for other flakes to pass therethrough.

Referring now to FIG. 11, a modified form of screener is shown. This screener is substantially identical to the screener 86 described above except that it has two spaced concentric screens operatively connected to the shaft 104 rather than the one screen 108 in the screener 86. The two screens are herein designated as a relatively coarse screen 121 and a relatively fine screen 123 which are held in spaced relation by brackets 125. The operation of the screener shown in FIG. 11 is substantially identical to the operation of screener 86 except that when flakes passing out through inlet 112 are deposited on coarse screen 121, only those flakes having relatively large area will be held on said screen 121 and all the remaining flakes will pass through the screen 121 to the screen 123. On screen 123 those flakes having an area greater than the area of the spacings in the screen 123 will remain on the screen 123 and only the remaining flakes will pass into the trough 88. Accordingly, it will be seen that the screener shown in FIG. 11 is effective for separating two distinct fractions of flakes from the total elutriated fraction of flakes and for rejecting all others.

Referring now to FIGS. 5 and 6, another form of delaminator embodying the present invention is shown. This modified form of delaminator is generally designated by the reference numeral 126. The delaminator 126 is adapted to be disposed at the bottom of the pipe 32 in substantially the same position as the delaminator 33 shown in FIG. 1. In delaminator 126 the rotor 128 is in the form of a circular disc but the upper surface 130 thereof is conical or scooped out in form. The rotor 128 is connected to the output shaft 42 of motor 44 at the center thereof. The stator 132 is also in the form of a circular disc having a plurality of ears 134 which are adapted to cooperate with the studs or bolts 64 mounted on the pipe 32 to prevent rotation of the stator and to limit its vertical movement as was described hereinbefore with regard to delaminator 33. Stator 132 is provided with a central aperture 136 which is adapted to surround with clearance the upper end of shaft 42. Extending out from the central aperture 136 are a plurality of slots 138, here shown as four in number. Slots 138 extend through stator 132 at an angle to the horizontal, the angle being in the direction of the rotation of the rotor. This angular disposition of the slots 138 is provided by beveling the edges 140 and 142 of the slots 138.

To hold the stator against rotation and to limit the vertical movement thereof, spring biasing means are employed. Specifically, three angle brackets 144 are secured to the pipe 32 as by rivets 146, the angle brackets being similarly spaced as the ears 134 on the stator. The angle brackets are provided with apertures through which bolts 148 may pass. These apertures are adapted to register with apertures 150 in ears 134. Disposed around each of the bolts 148 is a compression spring 152 which bears at its upper end against the head 154 of each bolt 148 and bears at its lower end against the associated ear 134 of stator 132. The bolts are held fixed relative to the angle brackets 144 by a pair of nuts 156. Accordingly, the compression on the springs 152 may be adjusted as desired. With the construction of delaminator 126 described, the operation will be substantially the same as that for delaminator 36 heretofore described. That is, with the rotor rotating mica and water will pass through the slots 138 in stator 132 to the space between the rotor and stator where the water will flow outwardly in a horizontal direction and with a large vertical velocity gradient. With the slots angularly related to the horizontal, preliminary orientation of the mica flakes will be obtained. Once disposed within the space, the mica chunk will be subjected to the shear forces resulting from the velocity gradient, which forces will tend to cleave the mica along its horizontal cleavage planes. In the event that the chunk passing into the space between the rotor and stator is larger than said space, then the stator is free to move upwardly to prevent jamming of the delaminator.

It has been stated in the prior art that it is extremely important to prevent newly delaminated mica flake from coming into contact with metal or the like as such contact will completely destroy the ability of mica flakes to cohere to one another so as to make a reconstituted sheet.

However, from a practical engineering viewpoint, much of the apparatus described above is made of metal. For instance, there are very few engineering materials available other than metal which may be satisfactorily used to form the rotor and stator of the delaminator and it is my present intention to employ metal for these parts. Moreover, although the pipes 32 and 68 and the vanes 80 can be made of other materials, I am presently employing metal with extremely satisfactory results. The screening 108 may also be made of plastic material or fiber glass or the like, but I am presently employing metal. Accordingly, it will be seen that in practicing my method on my apparatus, the mica flakes come into intimate contact with metal throughout their processing. However, I have found that the metal does not have a deleterious effect on the mica provided the mica flakes are used within a reasonable time after screening.

Accordingly, after flakes are collected in the container 116, it is desirable to lay them down in the form of a mat within a reasonable time thereafter. The actual method of laying down the mat forms no part of the present invention and any suitable method may be employed. For instance, the flakes suspended in liquid such as water may be deposited on a stationary screen and after the water is drained and evaporated off, an excellent reconstituted sheet is produced. To enhance the sheet, pressure is preferably applied thereto. In lieu thereof, a continuous paper making machine similar to conventional Fourdrinier machines may be employed. I have found that by using my method of delaminating and selecting synthetic mica flakes to be used in a reconstituted sheet, the resulting sheet will have a tensile strength and a dielectric strength many times that available in products now on the market or which can be made by prior art methods and apparatus. The quality of the sheet can be even further improved by sacrificing yield and taking a smaller fraction of the total flakes produced by the delaminator. That is, the quality of the sheet can be increased by either reducing the vertical velocity of the elutriating liquid or by decreasing the size of the screen or both.

While the method and apparatus described above has been directed particularly to a method for delaminating and classifying synthetic mica flake, it will be understood that the same apparatus and method can be employed in connection with natural mica, flake glass, bentonite or any other readily delaminable material. In no event is the preceding specification to be construed as limiting the present invention to use only with synthetic mica.

While I have herein shown and described my invention and have suggested various changes and modifications therein, other changes and modifications may be made therein within the scope of the appended claims without departing from the spirit and scope of this invention.

Having now described my invention, what I claim as new and desire to secure by Letters Patent, is:

1. A delaminator for delaminating a chunk of flake-like particles into relatively thin flakes, comprising a container for holding liquid, a rotating disc and a stationary disc disposed in said container in surface confronting relation, said stationary disc having a slot extending toward the periphery thereof and passing therethrough in the direction of rotation of said rotating disc, said slot being adapted to permit the passage of liquid and said chunk therethrough so as to dispose said chunk in between said confronting surfaces of said discs, the confronting surfaces of said discs being shaped so as to define therebetween a tapered space with the widest part thereof adjacent the axis of relative rotation and with the narrowest part thereof adjacent the periphery of said discs.

2. A delaminator for delaminating a chunk of flake-like particles into relatively thin flakes, comprising a container for holding liquid, a rotating disc and a stationary disc disposed in said container in surface confronting relation, and means for permitting movement of said stationary disc toward and away from said rotating disc, said stationary disc being provided with a cut-out portion adapted to permit the passage of liquid and said chunk therethrough so as to dispose said chunk in between said confronting surfaces of said discs, the confronting surfaces of said discs being shaped so as to define therebetween a tapered space with the widest part thereof adjacent the axis of relative rotation and with the narrowest part thereof adjacent the periphery of said discs.

3. A delaminator for delaminating a chunk of flake-like particles into relatively thin flakes, comprising a container for holding liquid, a rotating disc and a stationary disc disposed in said container in surface confronting relation, the confronting surfaces of said discs being shaped so as to define therebetween a tapered space with the widest part thereof adjacent the axis of relative rotation and with the narrowest part thereof adjacent the periphery of said discs, and means for permitting movement of said stationary disc toward and away from said rotating disc, said stationary disc having a slot extending toward the periphery thereof and passing through said stationary disc in the direction of rotation of said rotating disc, said slot being adapted to permit the passage of liquid and said chunk therethrough so as to dispose said chunk in between said confronting surfaces of said discs.

4. A delaminator for delaminating mica flakes from a chunk of mica, comprising a container for holding liquid, a rotor and a stator disposed in said container in surface confronting relation, said rotor being a substantially planar disc adapted to be connected to a rotatable shaft at the center of said disc, said stator being a substantially planar disc having a plurality of slots extending toward the periphery thereof, said slots extending through said stator at an angle to the horizontal in the direction of rotation of the rotor, the confronting surfaces of said rotor and stator being so shaped that the space therebetween tapers from the center of said delaminator to the periphery thereof.

5. A delaminator for delaminating mica flakes from a chunk of mica, comprising a container for holding liquid, a rotor and a stator disposed in said container in surface confronting relation, said rotor being a substantially planar disc adapted to be connected to a rotatable shaft at the center of said disc, said stator being a substantially planar disc having a plurality of slots extending toward the periphery thereof, said slots extending through said stator at an angle to the horizontal in the direction of rotation of the rotor, the confronting surface of said rotor being scooped out in substantially conical form so that the space between the rotor and stator tapers from the center of said delaminator to the periphery thereof.

6. In combination, a vertically extending tube having a bottom in sealed relation with said tube, another tube of smaller diameter than said first mentioned tube, said other tube extending into said first mentioned tube through the upper end thereof and having its lower end close to but spaced from said bottom, both ends of said other tube being open so as to permit the passage of liquid and readily delaminable material therethrough, a delaminator disposed within said first mentioned tube between said bottom and said lower end of said other tube, said first mentioned tube having an outlet adjacent the upper end thereof, whereby liquid flowing into said first mentioned tube through the bottom of said other tube will flow vertically upwardly and out through said outlet, and means disposed between said inlet and outlet for streamlining said vertical flow.

7. In combination, a first vertically extending tube having a bottom, a second vertically extending tube of smaller diameter than said first tube, said second tube having an upper open end disposed outside of said first tube and a lower open end disposed within said first tube to adapt said second tube for the passage of readily delaminable material therethrough, said second tube having an inlet for liquid adjacent the upper end thereof, the lower end of said second tube being spaced from said bottom of said first tube, a delaminator disposed within said first tube between said bottom and the lower end of said second tube, said first tube having an outlet adjacent the upper end thereof, and a plurality of vertically extending angularly related vanes disposed between the lower end of said second tube and said outlet.

8. In combination, a vertically extending container for liquid having an inlet adjacent the bottom thereof and an outlet adjacent the top, and a delaminator disposed within said container between said inlet and the bottom of the container, said delaminator comprising a rotating disc and a stationary disc disposed in said container in surface confronting relation, and means for permitting movement of said stationary disc toward and away from said rotating disc, said stationary disc having a slot extending toward the periphery thereof and passing therethrough in the direction of rotation of said rotating disc, said slot being adapted to permit the passage of a chunk of readily delaminable material therethrough so as to dispose said chunk in between said confronting surfaces of said discs.

9. In combination, a vertically extending container for liquid having an inlet adjacent the bottom thereof and an outlet adjacent the top, and a delaminator disposed within said container between said inlet and the bottom of the container, said delaminator comprising a rotating disc and a stationary disc disposed in said container in surface confronting relation, the confronting surfaces of said discs being shaped so as to define therebetween a tapered space with the thickest part thereof adjacent the axis of relative rotation and with the thinnest part thereof adjacent the periphery of said discs, and means for permitting movement of said stationary disc toward and away from said rotating disc, said stationary disc having a slot extending toward the periphery thereof and passing therethrough in the direction of rotation of said rotating disc, said slot being adapted to permit the passage of a chunk of readily delaminable material therethrough so as to dispose said chunk in between said confronting surfaces of said discs.

10. In combination, a first vertically extending tube having a bottom, a second vertically extending tube of smaller diameter than said first tube, said second tube having an upper open end disposed outside of said first tube and a lower open end disposed within said first tube to adapt said second tube for the passage of readily delaminable material therethrough, said second tube having an inlet for liquid adjacent the upper end thereof, the lower end of said second tube being spaced from said bottom of said first tube, a delaminator disposed within said first tube between said bottom and the lower end of said second tube, said delaminator comprising a horizontally oriented rotating disc and a horizontally oriented stationary disc disposed in said container in surface confronting relation, the confronting surfaces of said discs being shaped so as to define therebetween a tapered space with the widest part thereof adjacent the axis of relative rotation and with the narrowest part thereof adjacent the periphery of said discs, and means for permitting vertical movement of said stationary disc toward and away from said rotating disc, said stationary disc having a slot extending toward the periphery thereof and passing through said stationary disc in the direction of rotation of said rotating disc, said slot being adapted to permit the passage of a chunk of readily delaminable material therethrough so as to dispose said chunk in between said confronting surfaces of said discs, said first tube having an outlet adjacent the upper end thereof, and a plurality of vertically extending angularly related vanes disposed between the lower end of said second tube and said outlet.

11. The method of selecting from a random distribution of flake material a fraction of said flakes having a mean diameter to thickness ratio above a predetermined number, comprising the steps of disposing said flakes in an upwardly moving column of streamlined liquid, whereby to cause a portion of said flakes to pass upwardly with said liquid and another portion to drop to the bottom, and then screening said portion which moves upwardly with said liquid.

12. In the method of making a reconstituted sheet of a multiplicity of substantially parallel overlapping flakes of readily delaminable material, comprising the steps of delaminating said material into flakes, passing said flakes through an upwardly moving column of streamlined liquid, whereby to cause a portion of said flakes to pass upwardly with said liquid and another portion to drop to the bottom, and then screening said portion which moves upwardly with said liquid.

13. In the method of making a reconstituted sheet of a multiplicity of substantially parallel overlapping flakes of readily delaminable material, comprising the steps of delaminating said material into flakes, passing said flakes through an upwardly moving column of streamlined liquid, whereby to cause a portion of said flakes to pass upwardly with said liquid and another portion to drop to the bottom, further delaminating said portion which drops to the bottom, and then screening said portion which moves upwardly with said liquid.

14. Apparatus for producing flakes having a mean diameter to thickness ratio above a given ratio from a chunk of readily delaminable material, comprising a vertically extending elutriating column for liquid having an inlet adjacent the bottom thereof and an outlet adjacent the top, a delaminator disposed within said column between said inlet and the bottom of the column, and means disposed between said delaminator and said outlet for streamlining the flow of said column, a screener including a longitudinally extending screen disposed at an angle to the horizontal, and means operatively connected to said screen for oscillating said screen about an axis extending in the direction of the longitudinal axis of said screen, and a conduit connected at one end to said outlet of said container and having its other end disposed above the upper end of said screen.

15. Apparatus for producing flakes having a mean diameter to thickness ratio above a given ratio from a chunk of readily delaminable material, comprising a first vertically extending tube having a bottom, a second vertically extending tube of smaller diameter than said first tube, said second tube having an upper open end disposed outside of said first tube and a lower open end disposed within said first tube to adapt said second tube for the passage of readily delaminable material therethrough, said second tube having an inlet for liquid adjacent the upper end thereof, the lower end of said second tube being spaced from said bottom of said first tube, a delaminator disposed within said first tube between said bottom and the lower end of said second tube, said first tube having an outlet adjacent the upper end thereof, and a plurality of vertically extending angularly related vanes disposed between the lower end of said second tube and said outlet, a screener including a longitudinally extending arcuate screen disposed at an angle to the horizontal, said screener having an inlet adjacent the raised end of the screen and adapted to deposit on the upper surface of said screen a suspension of material to be screened and liquid, and means operatively connected to said screen for oscillating said screen about its longitudinal axis, and a conduit connected at one end to said outlet in said first tube and connected at its other end to said screener inlet.

16. A screener, comprising a relatively coarse longitudinally extending arcuate screen disposed at an angle to the horizontal, a relatively fine longitudinally extending arcuate screen disposed at substantially said angle to the horizontal and below said coarse screen, means for connecting said coarse and fine screens to one another, means operatively connected to said screens for oscillating them about an axis extending in the direction of the longitudinal axes of said screens, said screener having an inlet disposed above the upper end of said coarse screen.

17. A delaminator for delaminating readily delaminable material, comprising a container for holding liquid, a rotatable plate and a stationary plate disposed within said container in surface confronting relation, said stationary plate having a cut out portion adapted to permit said readily delaminable material to pass in between said stationary plate and said rotatable plate, said rotary plate being impervious to the flow of liquid therethrough.

18. A delaminator for delaminating a chunk of flake-like particles into relatively thin flakes, comprising a container for holding liquid, first and second relatively rotatable plates disposed in said container in surface confronting relation, one of said plates being provided with a cut-out portion adapted to permit the passage of liquid and said chunk therethrough so as to dispose said chunk in between said confronting surfaces of said plates, the confronting surfaces of said plates being shaped so as to define therebetween a tapered space with the thickest part thereof adjacent the axis of relative rotation and with the thinnest part thereof adjacent the periphery of said plates.

19. A delaminator as defined in claim 18 further comprising means for permitting relative movement of said plates toward and away from each other along the axis of relative rotation.

20. A delaminator for delaminating a chunk of flake-like particles into relatively thin flakes, comprising a container for holding a liquid, first and second relatively rotatable plates disposed in said container in surface confronting relation, one of said plates being provided with a cut-out portion adapted to permit the passage of liquid and said chunk therethrough so as to dispose said chunk in between said confronting surfaces of said plates, said plates being freely movable toward and away from one another, and means biasing said plates toward one another.

21. A delaminator for delaminating a chunk of flake-like particles into relatively thin flakes, comprising a container for holding liquid, first and second relatively rotatable plates disposed in said container in surface confronting relation, one of said plates being provided with a cut-out portion adapted to permit the passage of liquid and said chunk therethrough so as to dispose said chunk in between said confronting surfaces of said plates, said plates being freely movable toward and away from one another, and spring means for biasing said plates toward one another.

22. A delaminator for delaminating a chunk of flake-like particles into relatively thin flakes, comprising a container for holding liquid, first and second relatively rotatable plates disposed in said container in surface confronting relation, one of said plates being provided with a cut-out portion adapted to permit the passage of liquid and said chunk therethrough so as to dispose said chunk in between said confronting surfaces of said plates, said plates being horizontally disposed, the upper of said plates being freely vertically movable toward and away from said lower plate and being biased by gravity toward said lower plate.

23. The method of delaminating flaky readily delaminable material in a liquid medium, comprising the steps of disposing said material in said liquid, and imparting to said liquid high velocity planar laminar flow with a high velocity gradient normal to said flow to orient said flaky material parallel to said laminar flow and to delaminate said material.

24. The method of delaminating flaky readily delaminable material in a liquid medium, comprising the steps of disposing said material in said liquid, and imparting to said liquid high velocity planar laminar flow with a high velocity gradient normal to said flow to orient said flaky material parallel to said laminar flow and to delaminate said material, and slowly moving said material through said liquid in the direction of flow.

25. The method of delaminating mica in a liquid medium, comprising the steps of disposing said mica in said liquid, and imparting to said liquid high velocity planar laminar flow with a high velocity gradient normal to said flow to orient said mica with its cleavage planes parallel to said laminar flow and to delaminate said mica along at least one of said planes.

26. The method of delaminating mica in a liquid medium, comprising the steps of disposing said mica in said liquid, and imparting to said liquid high velocity planar laminar flow with a high velocity gradient normal to said flow to orient said mica with its cleavage planes parallel to said laminar flow and to delaminate said mica along at least one of said planes, and slowly moving said mica through said liquid in the direction of flow.

27. In combination, a first vertically extending tube having a bottom in sealed relation therewith, a delaminator disposed within said first tube adjacent the bottom thereof, said delaminator having vertically superposed a rotor and a stator, a second vertically extending tube of smaller diameter than said first tube and extending into said first tube, both ends of said second tube being opened to permit the passage of liquid and readily delaminable material therethrough into said first tube, the lower end of said second tube being disposed above both said rotor and stator of said delaminator, said first tube having an outlet disposed above said delaminator, said first tube being filled from said bottom up to said outlet with liquid and readily delaminable material, said outlet being a sufficient vertical distance above said delaminator so that turbulence of said liquid in said first tube caused by said delaminator does not affect substantially the liquid in said first tube adjacent said outlet.

References Cited in the file of this patent

UNITED STATES PATENTS

| | | |
|---|---|---|
| 30,085 | Norton | Sept. 18, 1860 |
| 35,904 | Varney | July 15, 1862 |
| 91,805 | Wirt | June 22, 1869 |
| 603,319 | Crowell | May 3, 1898 |
| 1,090,933 | Megraw | Mar. 24, 1914 |
| 1,459,840 | Mitchell | June 26, 1923 |
| 1,697,704 | Wood | Jan. 1, 1929 |
| 2,041,207 | Rietz | May 19, 1936 |
| 2,119,595 | McNeely | June 7, 1938 |
| 2,297,009 | Mead | Sept. 29, 1942 |
| 2,380,741 | Fisher | July 31, 1945 |
| 2,490,129 | Heyman | Dec. 6, 1949 |
| 2,496,359 | Rymann | Feb. 7, 1950 |
| 2,612,889 | Heyman | Oct. 7, 1952 |
| 2,659,412 | Heyman | Nov. 17, 1953 |
| 2,699,295 | Page | Jan. 11, 1955 |
| 2,708,032 | Heyman | May 10, 1955 |
| 2,951,649 | Reitz | Sept. 6, 1960 |

FOREIGN PATENTS

| | | |
|---|---|---|
| 650,659 | Germany | Sept. 27, 1937 |
| 443,618 | Italy | May 24, 1948 |